US011679513B2

United States Patent
Sato

(10) Patent No.: US 11,679,513 B2
(45) Date of Patent: Jun. 20, 2023

(54) END EFFECTOR EXCHANGE DEVICE

(71) Applicant: SMC CORPORATION, Tokyo (JP)

(72) Inventor: Motohiro Sato, Toride (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/658,889

(22) Filed: Apr. 12, 2022

(65) Prior Publication Data
US 2022/0339797 A1 Oct. 27, 2022

(30) Foreign Application Priority Data
Apr. 22, 2021 (JP) .............................. JP2021-072709

(51) Int. Cl.
*B25J 15/04* (2006.01)
(52) U.S. Cl.
CPC ....... *B25J 15/0416* (2013.01); *B25J 15/0425* (2013.01)
(58) Field of Classification Search
CPC .... B25J 15/0416; B25J 15/0425; B25J 15/04; B25J 15/0061; B25J 15/00491; B25J 19/0033
See application file for complete search history.

(56) References Cited

U.S. PATENT DOCUMENTS

| | | | |
|---|---|---|---|
| 2016/0059424 A1* | 3/2016 | Zachary ............... | B25J 15/0416 483/1 |
| 2017/0144230 A1* | 5/2017 | Rosso ................. | B23B 31/4046 |
| 2017/0232620 A1* | 8/2017 | Kalb .................... | B25J 15/0416 279/2.09 |
| 2018/0272543 A1* | 9/2018 | Kayama ................ | B25J 9/1687 |
| 2018/0304475 A1* | 10/2018 | Zachary ............... | B25J 15/0416 |
| 2019/0255713 A1* | 8/2019 | Churchill ............ | B25J 15/0416 |
| 2020/0108497 A1* | 4/2020 | Miyazaki .............. | B25J 15/045 |
| 2021/0387357 A1* | 12/2021 | Kendrick ............. | B25J 15/0061 |
| 2022/0297314 A1* | 9/2022 | Ganninger .............. | B25J 9/023 |

FOREIGN PATENT DOCUMENTS

WO    WO 2019/114895 A1    6/2019

* cited by examiner

*Primary Examiner* — Zakaria Elahmadi
(74) *Attorney, Agent, or Firm* — Oblon, McClelland, Maier & Neustadt, L.L.P.

(57) ABSTRACT

A slide portion of a first adapter is fitted into a slot of a second adapter, and a ball is disposed between a cam member supported by the slide portion and an opening edge portion constituting the slot. The ball can advance toward or retreat from an engagement groove of the opening edge portion by movement of the cam member. By operating a release button connected integrally with the cam member and also sliding the first adapter and the second adapter relative to each other, the ball retreats, and the first adapter and the second adapter are separated from each other.

8 Claims, 16 Drawing Sheets

END EFFECTOR EXCHANGE DEVICE

CROSS-REFERENCE TO RELATED APPLICATIONS

This application is based upon and claims the benefit of priority from Japanese Patent Application No. 2021-072709 filed on Apr. 22, 2021, the contents of which are incorporated herein by reference.

BACKGROUND OF THE INVENTION

Field of the Invention

The present invention relates to an end effector exchange device for manually exchanging members (hereinafter referred to as "end effectors") such as tools, jigs, chucks, and grippers attached to a robot arm, a transport device, or the like (hereinafter referred to as "robot arm or the like").

Description of the Related Art

Conventionally, there has been known a technique of detachably attaching end effectors to a tip of a robot arm so that various end effectors can be attached to the tip of the robot arm in accordance with work performed by an industrial robot.

For example, WO 2019/114895 A1 describes a connector in which a first portion connected to a robot and a second portion connected to a gripper are connected by a separable hinge, and a push button for releasing engagement between the first portion and the second portion is provided.

SUMMARY OF THE INVENTION

In such a device for exchanging an end effector, when the end effector is manually removed from a robot arm or the like, the end effector may be unexpectedly detached. In particular, when the weight of the end effector is large, it is necessary to consider the safety of an operator.

The present invention has the object of solving the aforementioned problem.

An end effector exchange device according to the present invention comprises: a first adapter; and a second adapter, one of the first adapter or the second adapter being attached to a robot arm or a transport device, and an end effector being attached to another one of the first adapter or the second adapter. A slide portion of the first adapter is fitted into a slot of the second adapter. A ball is disposed between a cam member supported by the slide portion and an opening edge portion constituting the slot. The ball is configured to advance toward or retreat from an engagement groove of the opening edge portion by movement of the cam member. By operating a release button connected integrally with the cam member and also sliding the first adapter and the second adapter relative to each other, the ball retreats, and the first adapter and the second adapter are separated from each other.

According to the above-described end effector exchange device, the first adapter and the second adapter can be separated from each other by sliding the first adapter and the second adapter relative to each other after operating the release button. The first adapter and the second adapter cannot be separated from each other only by pressing the release button. Therefore, the adapter to which the end effector is attached is not unexpectedly detached, and the safety of the operator is improved.

The end effector exchange device according to the present invention is configured such that the first adapter and the second adapter can be separated from each other by operating the release button and also sliding the first adapter and the second adapter relative to each other. Therefore, the adapter to which the end effector is attached is not unexpectedly detached, and the safety of the operator is improved.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
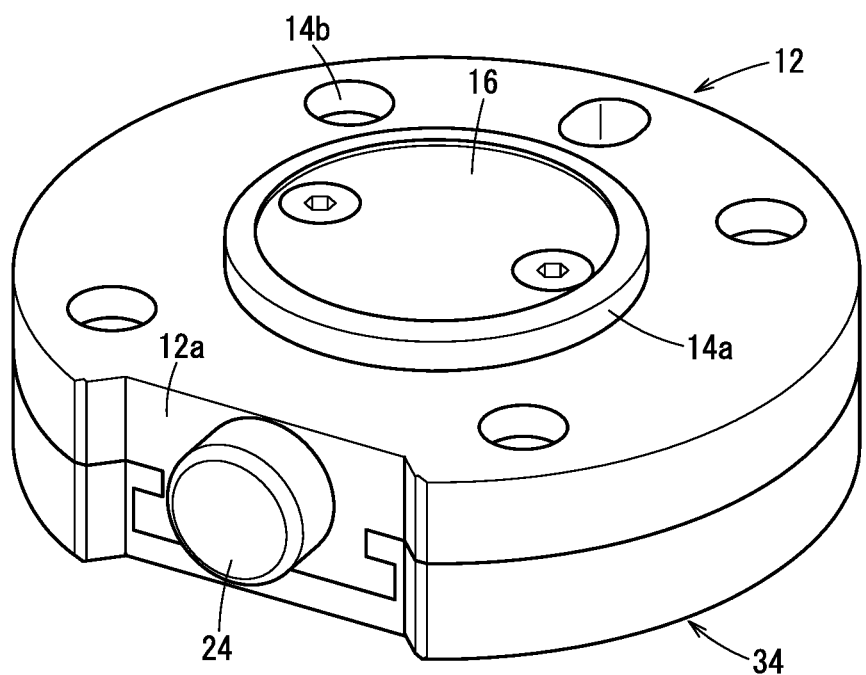
FIG. 1 is an external view of an end effector exchange device according to a first embodiment of the present invention.

In the following description, when terms in relation to upper and lower directions are used, for the sake of convenience, such terms refer to the directions shown in the drawings, however, the actual arrangement of the respective constituent members or the like is not limited thereby.

First Embodiment

An end effector exchange device 10 according to a first embodiment of the present invention will be described with reference to FIGS. 1 to 13. As shown in FIG. 1, the end effector exchange device 10 includes a first adapter 12 and a second adapter 34 having the same disk shape in plan view.

Figure 2:
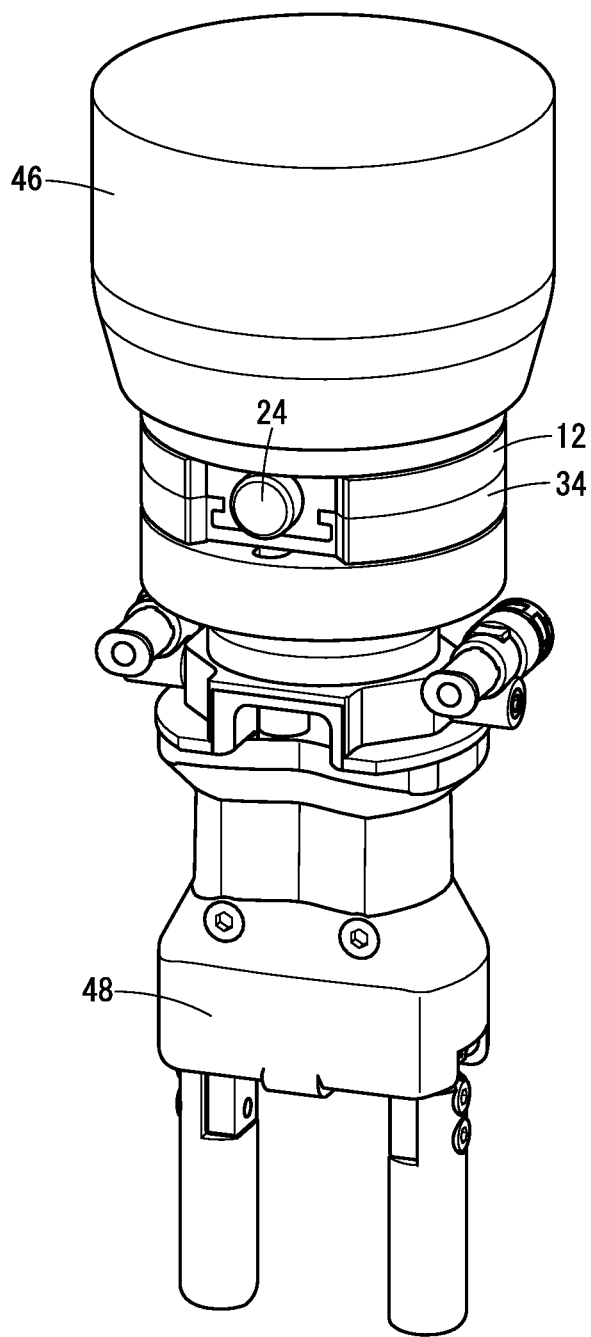
FIG. 2 is a view showing an example of use of the end effector exchange device of FIG. 1.

As shown in FIG. 2, the end effector exchange device 10 is used, for example, in a form in which the second adapter 34 to which a desired end effector 48 is attached is connected to the first adapter 12 attached to a robot arm 46.

Figure 3:
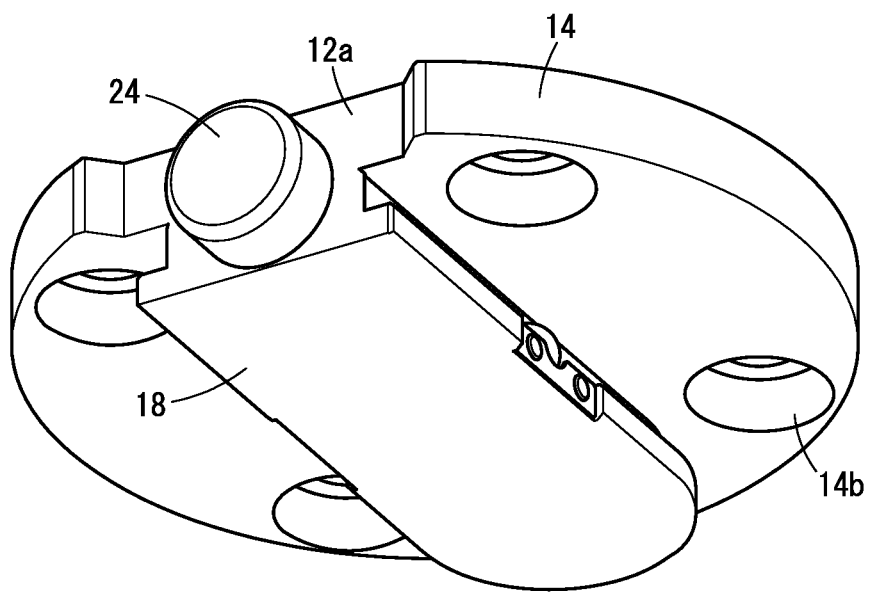
FIG. 3 is an external view of a first adapter of the end effector exchange device of FIG. 1.
Figure 6:
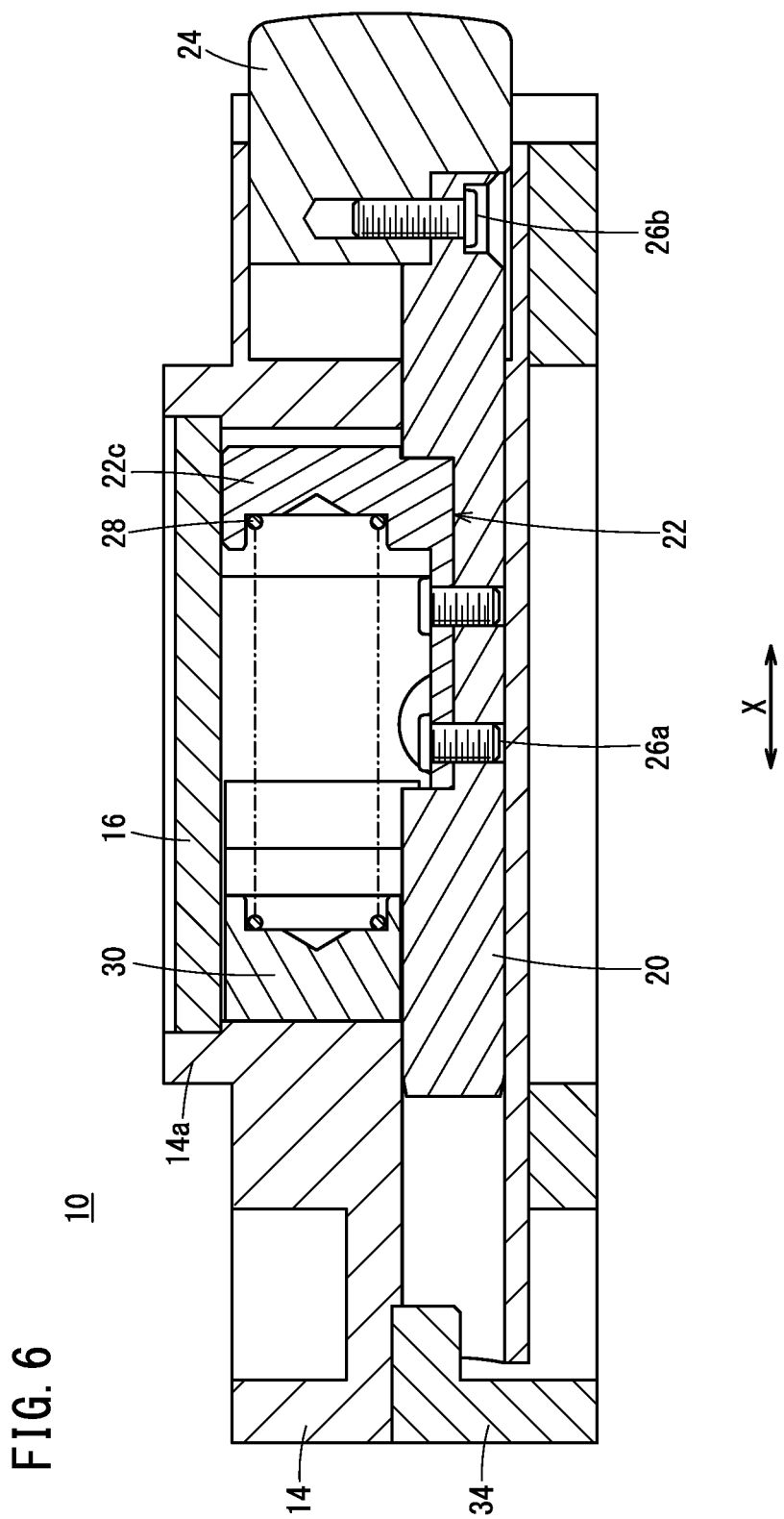
FIG. 6 is a cross-sectional view taken along line I-I of FIG. 5.
Figure 8:
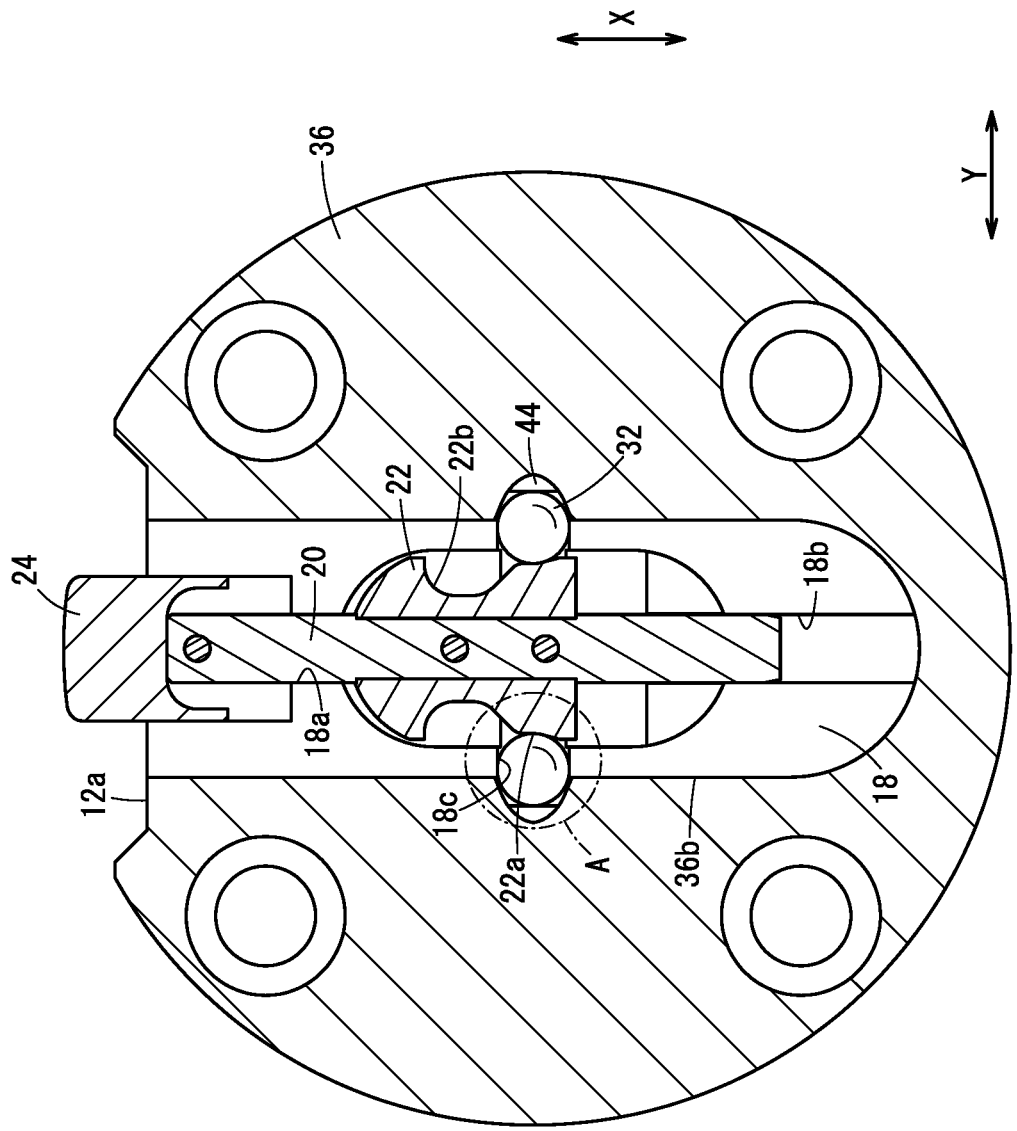
FIG. 8 is a cross-sectional view taken along line III-III of FIG. 7.
Figure 9:
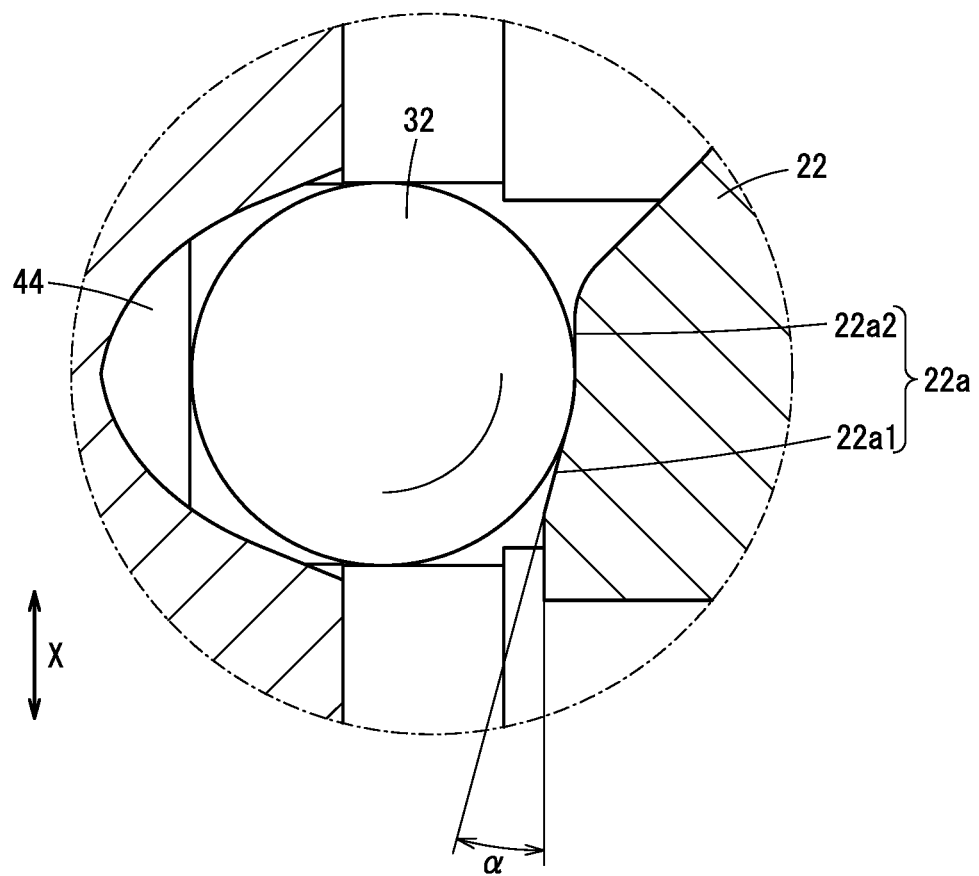
FIG. 9 is an enlarged view of a portion A of FIG. 8.

As shown in FIG. 3, the first adapter 12 includes a disk-shaped main body portion 14, and a slide portion 18 protruding downward from the main body portion 14. The slide portion 18 having a T-shaped cross section extends in a direction along the diameter of the main body portion 14. As shown in FIGS. 6 and 8, a guide rod 20 is disposed inside the slide portion 18. One end portion and the other end portion of the guide rod 20 are respectively disposed in a first guide groove 18a and a second guide groove 18b inside the slide portion 18. Thus, the guide rod 20 is supported so as to be movable in the longitudinal direction of the slide portion 18 (X direction).

A cam member 22 is connected to the center of the guide rod 20 by first screws 26a. A release button 24 is connected to an end portion of the guide rod 20 by a second screw 26b. The first adapter 12 includes a concave surface 12a formed by cutting out a part of the outer periphery of the first adapter 12 in a direction orthogonal to the longitudinal direction of the slide portion 18. The release button 24 is exposed to the outside from the concave surface 12a.

An end portion of the cam member 22 rises upward and constitutes a spring receiving portion 22c extending into the main body portion 14. A coil spring 28 is disposed between a spring receiver 30 arranged inside the main body portion 14 and the spring receiving portion 22c of the cam member 22. The cam member 22, the guide rod 20, and the release button 24, which are integrally connected to each other, receive the biasing force of the coil spring 28. As a result, the release button 24 is biased in a direction in which the release button 24 protrudes outward from the concave surface 12a.

Both side surfaces of the cam member 22 are each provided with a cam portion 22a, and a ball receiving groove 22b positioned closer to the release button 24 than the cam portion 22a is. The cam portion 22a includes an inclined part 22a1 inclined at an angle α with respect to the moving direction of the guide rod 20 (X direction), and a parallel part 22a2 parallel to the moving direction of the guide rod 20. The parallel part 22a2 is positioned between the inclined part 22a1 and the ball receiving groove 22b (see FIG. 9). The slide portion 18 includes a pair of ball grooves 18c at positions adjacent to the cam member 22. A ball (steel ball) 32 is disposed in each ball groove 18c.

The upper portion of the main body portion 14 includes a circular fitting portion 14a. A circular cover member 16 covering above the guide rod 20, the cam member 22, and the coil spring 28 is fitted to the fitting portion 14a. The fitting portion 14a serves as a positioning member when the first adapter 12 is attached to the robot arm 46. Reference symbol 14b denotes bolt insertion holes for attaching the first adapter 12 to the robot arm 46.

Figure 4:
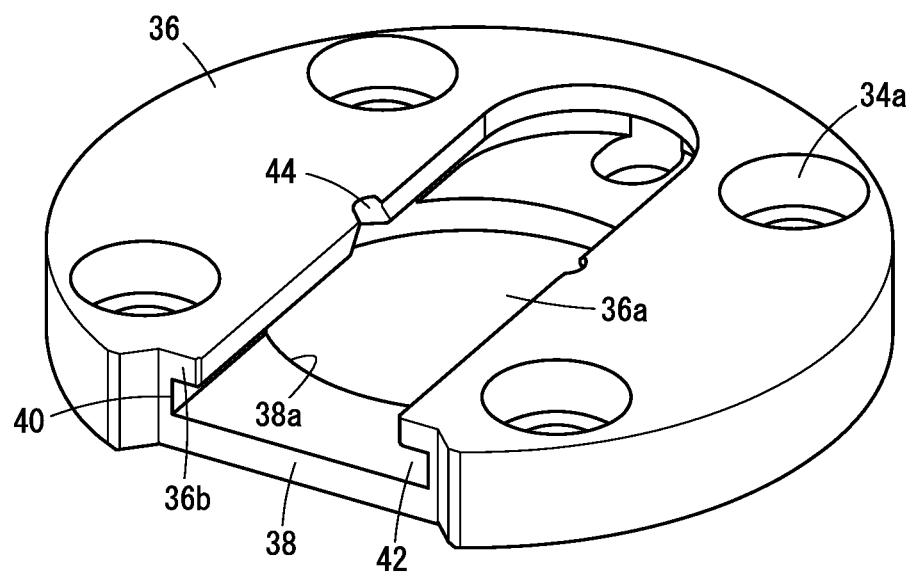
FIG. 4 is an external view of a second adapter of the end effector exchange device of FIG. 1.
Figure 5:
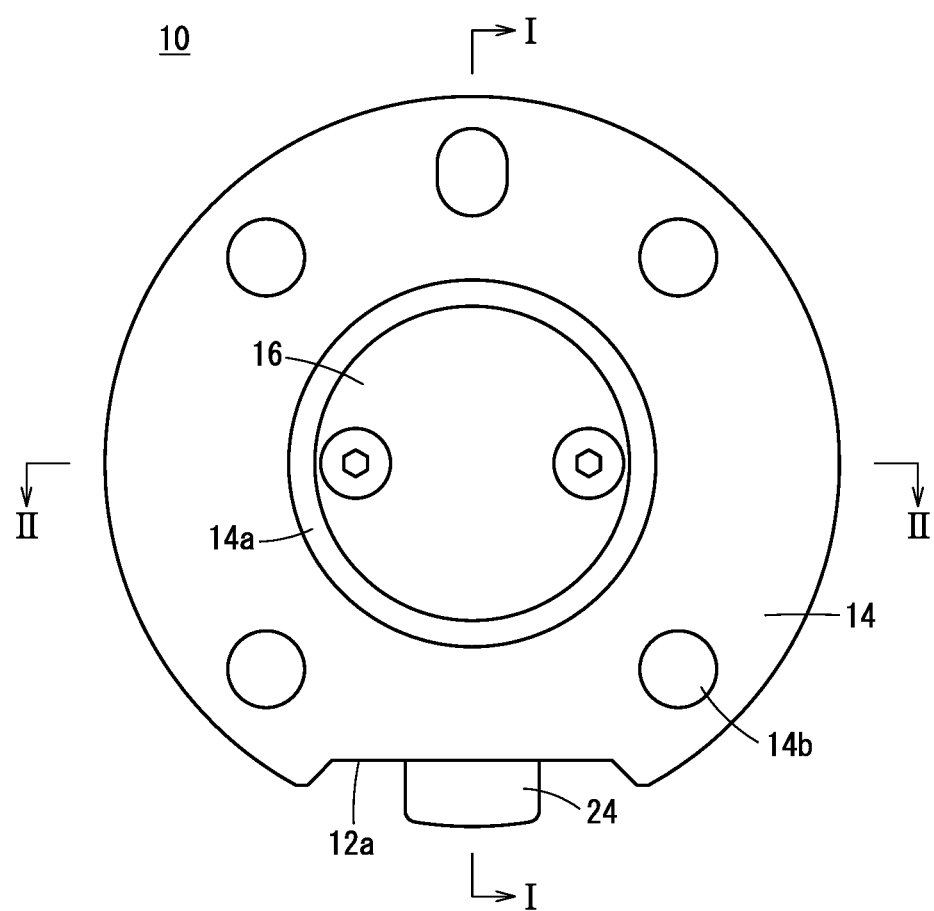
FIG. 5 is a plan view of the end effector exchange device of FIG. 1.

As shown in FIG. 4, the second adapter 34 includes an upper plate portion 36 having an opening 36a, and a lower plate portion 38 having a circular hole 38a. A U-shaped opening edge portion 36b of the upper plate portion 36 is connected to the lower plate portion 38 via a vertical wall portion 40. The opening edge portion 36b, the vertical wall portion 40, and the lower plate portion 38 constitute a T-shaped slot 42.

The slide portion 18 of the first adapter 12 is fitted into the slot 42 of the second adapter 34, whereby the second adapter 34 is supported so as to be slidable in the horizontal direction with respect to the first adapter 12. At this time, an upper surface of the upper plate portion 36 of the second adapter 34 is parallel to a lower surface of the main body portion 14 of the first adapter 12. The upper surface and the lower surface face each other with a slight gap therebetween, or are in contact with each other. Reference symbol 34a denotes bolt insertion holes for attaching the end effector 48 to the second adapter 34.

When the slide portion 18 of the first adapter 12 is inserted deep into the slot 42 of the second adapter 34, the central axis of the second adapter 34 coincides with the central axis of the first adapter 12, and the side surface of the second adapter 34 is flush with the side surface of the first adapter (see FIG. 2). When the slide portion 18 is completely disengaged from the slot 42, the second adapter 34 separates from the first adapter 12 (see FIG. 13).

As shown in FIG. 8, the ball 32 disposed in the ball groove 18c of the slide portion 18 of the first adapter 12 is positioned between the cam member 22 disposed on the slide portion 18 and the opening edge portion 36b of the upper plate portion 36 of the second adapter 34. The opening edge portion 36b is provided with an engagement groove 44 having a wall surface against which the ball 32 can abut. When the slide portion 18 of the first adapter 12 is inserted deep into the slot 42 of the second adapter 34, the ball 32 faces the engagement groove 44.

Figure 7:
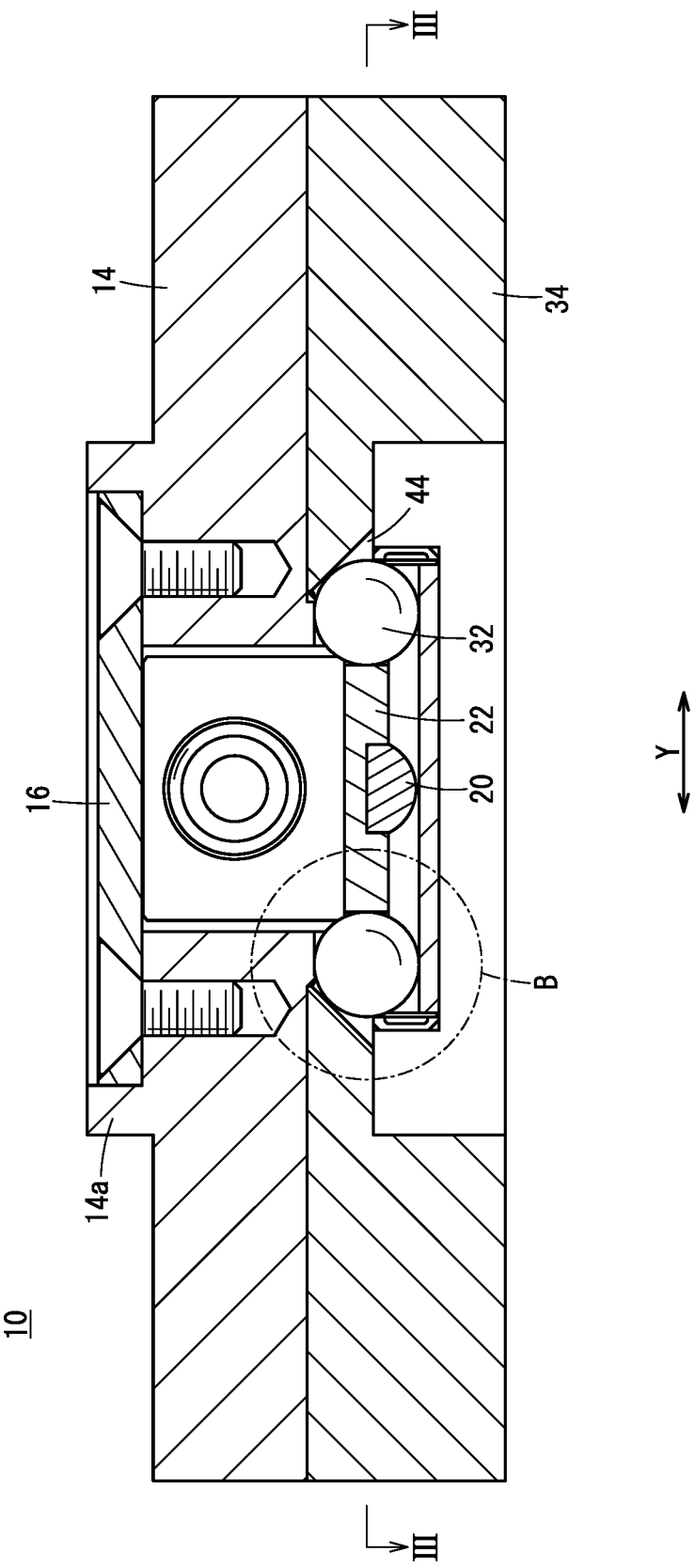
FIG. 7 is a cross-sectional view taken along line II-II of FIG. 5.
Figure 10:
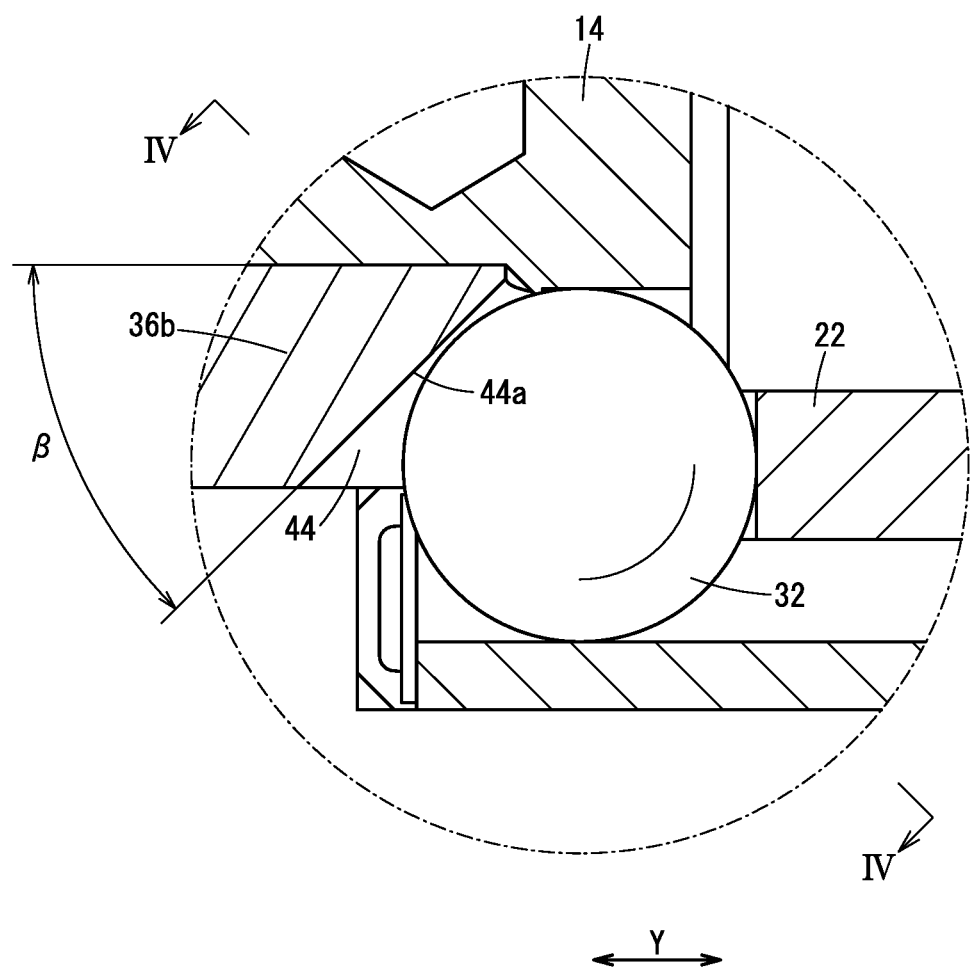
FIG. 10 is an enlarged view of a portion B of FIG. 7.

As shown in FIGS. 7 and 10, a line (valley line 44a) connecting the deepest points of the engagement groove 44 is farther from the opening 36a as it goes downward. The valley line 44a is inclined by an angle β with respect to the upper surface of the upper plate portion 36 when viewed from the direction along the moving direction of the cam member 22. In other words, the valley line 44a of the engagement groove 44 is inclined by the angle β with respect to the advancing/retreating direction of the ball 32 (Y direction).

Figure 11:
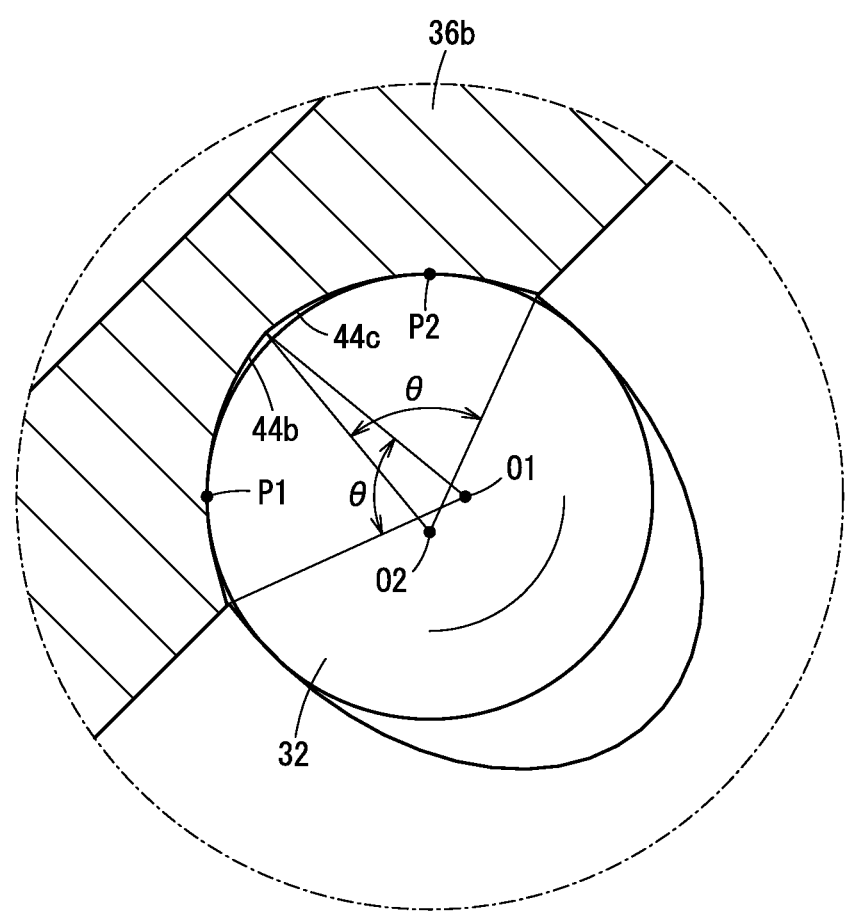
FIG. 11 is a cross-sectional view taken along line IV-IV of FIG. 10.
Figure 12:
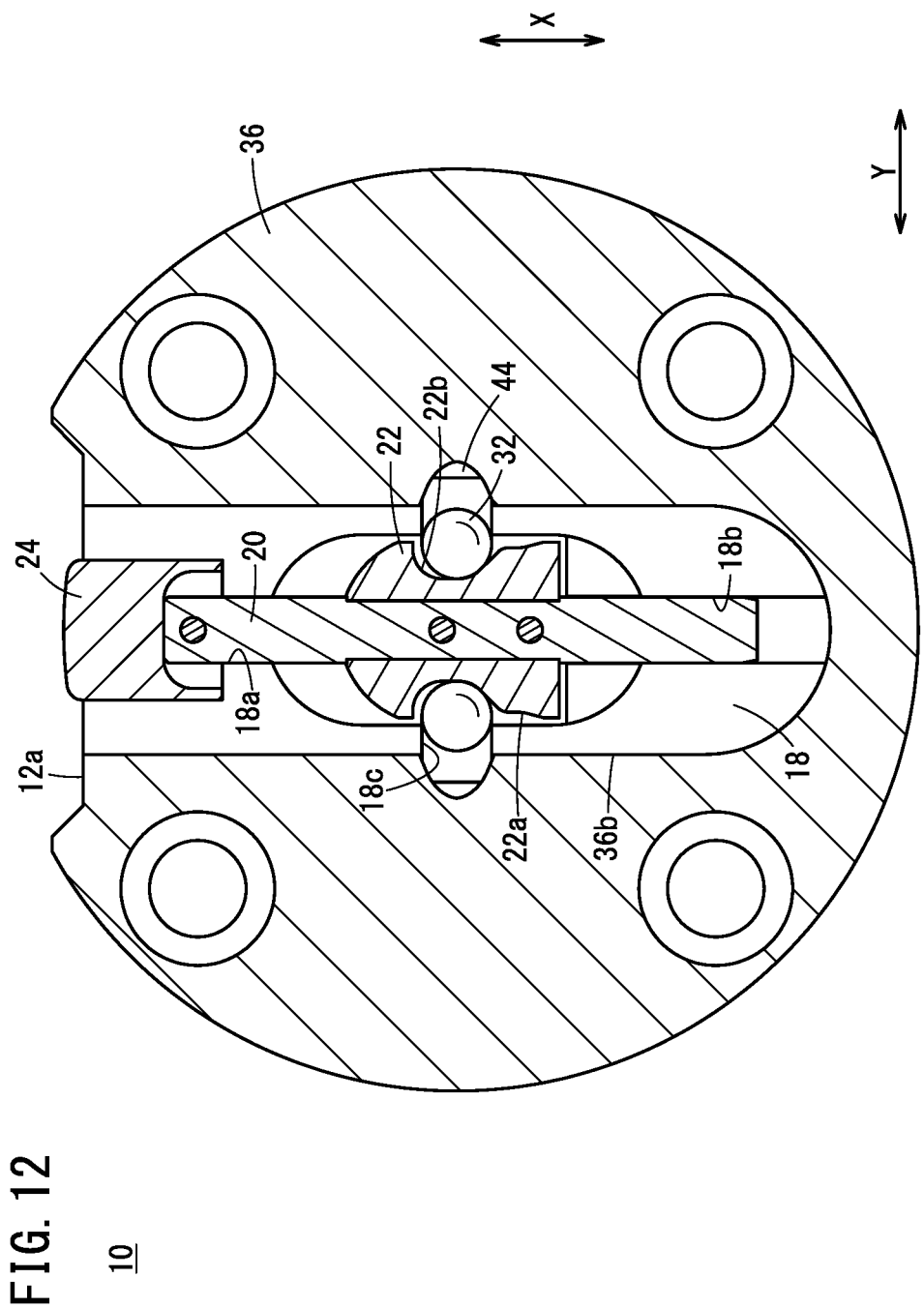
FIG. 12 is a view corresponding to FIG. 8 when a release button is operated.
Figure 13:
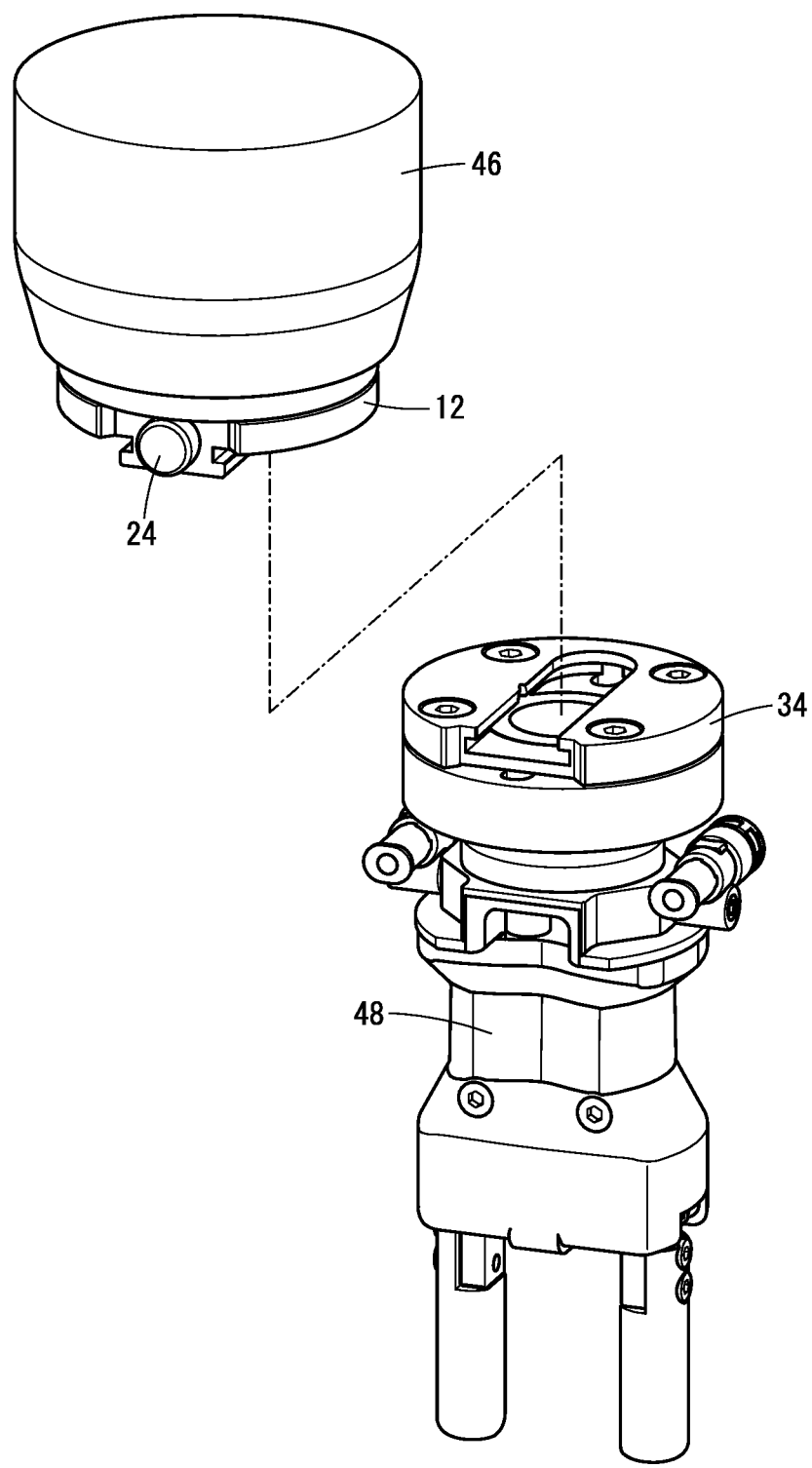
FIG. 13 is a view showing a state in which the second adapter is separated from the first adapter in the example of use of FIG. 2.

FIG. 11 shows the outline of the engagement groove 44 when cut along a plane including the center of the ball 32 and perpendicular to the valley line 44a in a state where the ball 32 abuts against the wall surface of the engagement groove 44. This outline is a symmetrical combination of two arcs 44b and 44c having larger radii than the radius of the ball 32.

Specifically, the wall surface shape of the engagement groove 44 is formed by joining together two identical cylindrical surfaces each cut out with a central angle θ smaller than 90 degrees, the two cylindrical surfaces being joined on their generating lines so that the joining line thereof becomes the valley line 44a of the engagement groove 44. The ball 32 abuts against the wall surface of the engagement groove 44 formed of the two cylindrical surfaces, at two points, namely, a point P1 and a point P2. The point denoted by reference symbol O1 is the center of a circle forming the arc 44b, and the point denoted by reference symbol O2 is the center of a circle forming the arc 44c.

The end effector exchange device 10 according to the present embodiment is configured as described above, and the operation thereof will be described below. A state, in which the slide portion 18 of the first adapter 12 is inserted deep into the slot 42 of the second adapter 34 and the release button 24 protrudes from the concave surface 12a of the first adapter 12, is defined as an initial state (see FIG. 8).

In the initial state, the cam member 22 receives the biasing force of the coil spring 28 and presses the ball 32 by the inclined part 22a1 thereof. The ball 32 protrudes from the ball groove 18c of the slide portion 18 and abuts against the wall surface of the engagement groove 44. Therefore, in the engagement groove 44, the second adapter 34 is engaged with the slide portion 18 of the first adapter 12 via the ball 32, and the second adapter 34 cannot be slid with respect to the first adapter 12.

In this case, the ball 32 abuts against the wall surface of the engagement groove 44 that is inclined by the angle β with respect to the advancing/retreating direction of the ball 32. Therefore, a force that brings the upper surface of the second adapter 34 into close contact with the lower surface of the main body portion 14 of the first adapter 12 acts, and the second adapter 34 is supported by the first adapter 12 without rattling. In addition, the ball 32 abuts against the wall surface of the engagement groove 44 formed of the cylindrical surfaces, at two points, namely, the point P1 and the point P2. For this reason, compared to a case where the ball 32 abuts against the wall surface of the engagement groove 44 formed of a flat surface, the surface pressure can be reduced, and rattling does not occur even when a large external force is applied to the second adapter 34.

Further, the inclined part 22a1 of the cam member 22 is connected to the ball receiving groove 22b via the parallel part 22a2. Therefore, even when an external force in a direction of sliding the second adapter 34 is applied to the second adapter in a state where the release button 24 is not pressed, the ball 32 stays in the parallel part 22a2 and does not move to the ball receiving groove 22b. Therefore, the second adapter 34 cannot be slid unless the release button 24 is operated.

When an operator presses the release button 24, the guide rod 20 and the cam member 22 connected integrally with the release button 24 move against the biasing force of the coil spring 28. This allows the ball 32 to retreat from the engagement groove 44 toward the ball receiving groove 22b. Then, when the operator applies a force to the second adapter 34 in a direction in which the slide portion 18 of the first adapter 12 is pulled out from the slot 42 of the second adapter 34, the ball 32 drops into the ball receiving groove 22b and retreats to a position where the ball 32 does not protrude from the slide portion 18 (see FIG. 12). Therefore, the operator can separate the second adapter 34 from the first adapter 12 by sliding the second adapter 34 (see FIG. 13).

In order to connect the second adapter 34 to the first adapter 12 after exchanging the end effector 48 attached to the separated second adapter 34 with another end effector, the following procedure may be performed, for example.

First, the operator fits the slide portion 18 of the first adapter 12 into the slot 42 of the second adapter 34 while supporting the second adapter 34 with both hands. Then, the operator slides the second adapter 34 relative to the first adapter 12 until the opening edge portion 36b at the entrance of the slot 42 abuts against the ball 32 protruding from the slide portion 18. In this state, since the slide portion 18 is fitted into the slot 42 over a predetermined length, the second adapter 34 does not fall even if the operator releases the hands from the second adapter 34.

Next, while pressing the release button 24 with one hand, the operator slides the second adapter 34 with the other hand until the slide portion 18 of the first adapter 12 is inserted deep into the slot 42 of the second adapter 34. Then, when the operator takes the hand off the release button 24, the ball 32 abuts against the wall surface of the engagement groove 44 by the biasing force of the coil spring 28, and the end effector exchange device 10 returns to the initial state.

According to the end effector exchange device 10 of the present embodiment, the first adapter 12 and the second adapter 34 can be separated from each other by operating the release button 24 and also sliding the first adapter 12 and the second adapter 34 relative to each other. Therefore, the second adapter 34 to which the end effector 48 is attached is not unexpectedly detached and dropped, and the safety of the operator is improved.

In the present embodiment, the description is made for a case in which the end effector exchange device 10 is used by attaching the first adapter 12 to the robot arm 46 and attaching the end effector 48 to the second adapter 34. However, the end effector exchange device 10 may be used by attaching the second adapter 34 to the robot arm 46 and attaching the end effector 48 to the first adapter 12.

Second Embodiment

Next, an end effector exchange device 50 according to a second embodiment of the present invention will be described with reference to FIGS. 14 to 16. The second embodiment is different from the first embodiment in the shape of the engagement groove. The same components as those of the end effector exchange device 10 described above are denoted by the same reference numerals, and detailed description thereof will be omitted.

Figure 14:
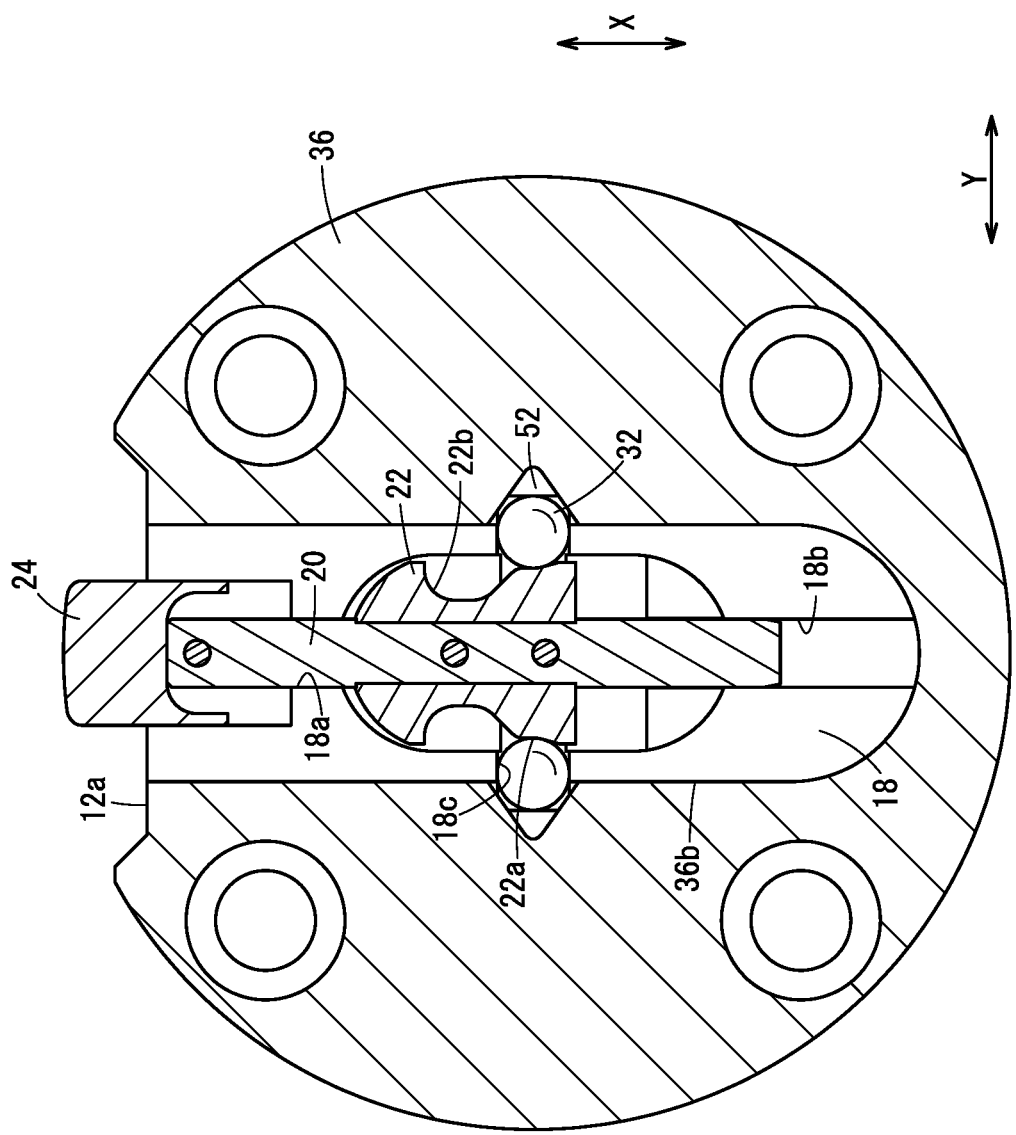
FIG. 14 is a view corresponding to FIG. 8 for describing an end effector exchange device according to a second embodiment of the present invention.
Figure 15:
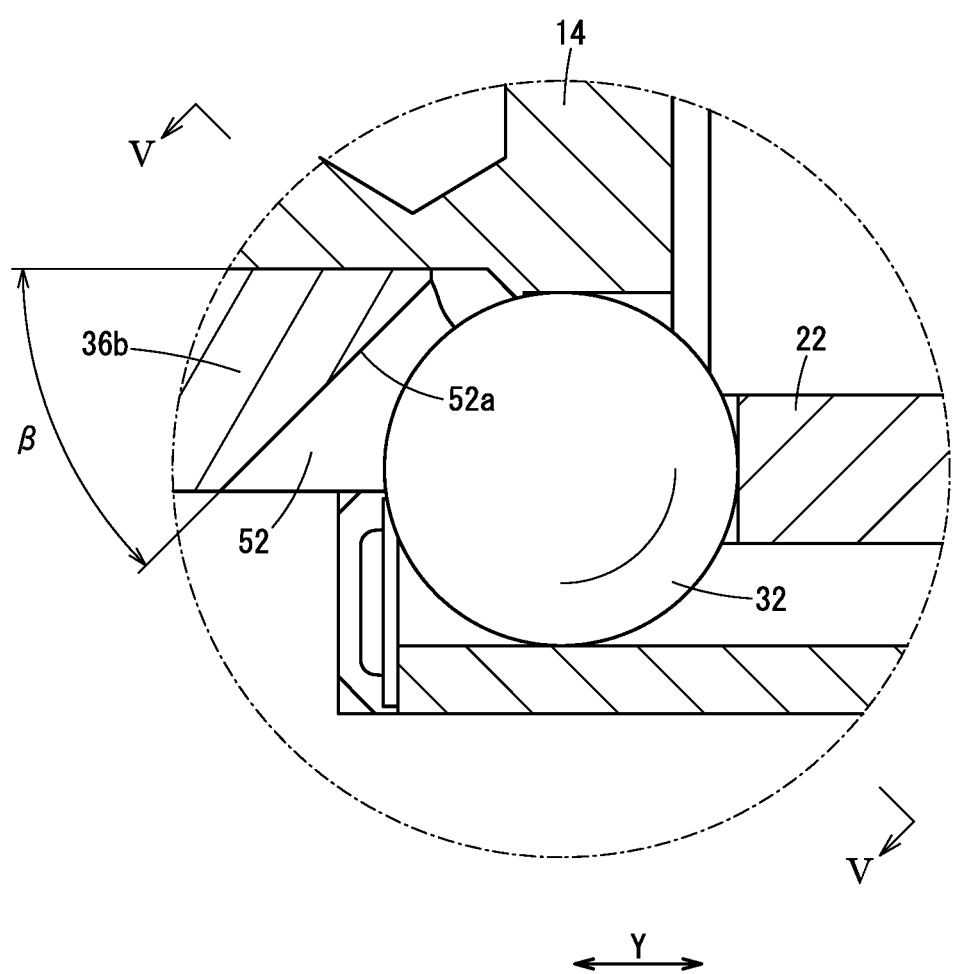
FIG. 15 is a view corresponding to FIG. 10 for describing an engagement groove of the end effector exchange device of FIG. 14.

As shown in FIG. 14, the ball 32 disposed in the ball groove 18c of the slide portion 18 of the first adapter 12 is positioned between the cam member 22 supported by the slide portion 18 and the opening edge portion 36b of the upper plate portion 36 of the second adapter 34. The opening edge portion 36b includes an engagement groove 52 having a wall surface against which the ball 32 can abut. As shown in FIG. 15, a valley line 52a of the engagement groove 52 is inclined by an angle β with respect to the advancing/retreating direction of the ball 32 (Y direction) so as to be farther from the opening 36a as it goes downward.

Figure 16:
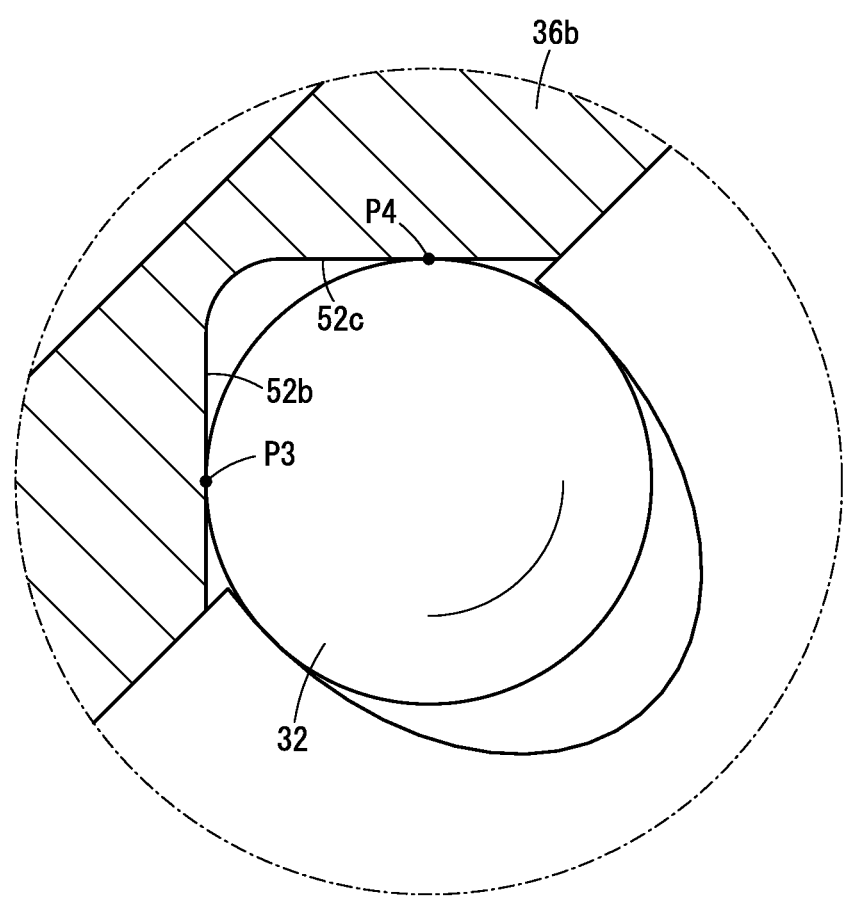
FIG. 16 is a cross-sectional view taken along line V-V of FIG. 15.

FIG. 16 shows the outline of the engagement groove 52 when cut along a plane including the center of the ball 32 and perpendicular to the valley line 52a in a state where the ball 32 abuts against the wall surface of the engagement groove 52. The outline has a V-shape including two straight portions 52b and 52c. The wall surface shape of the engagement groove 52 is formed by causing two flat surfaces to intersect each other at an angle of approximately 90 degrees, and rounding the intersection portion thereof. The valley line 52a of the engagement groove 52 is a line passing through the deepest portion in the rounded part. The ball 32 abuts against the wall surface of the engagement groove 52 including the two flat surfaces, at two points, namely, a point P3 and a point P4. In the present embodiment, two flat surfaces constituting the wall surface shape of the engagement groove 52 intersect at an angle of approximately 90 degrees, but the two flat surfaces may intersect at an angle greater than 90 degrees or may intersect at an angle less than 90 degrees.

When the release button 24 is not operated, the cam member 22 receives the biasing force of the coil spring 28 and presses the ball 32 by the inclined part 22a1 thereof, and the ball 32 abuts against the wall surface of the engagement groove 52. Therefore, the engagement groove 52 of the second adapter 34 engages with the slide portion 18 of the first adapter 12 via the ball 32, and the second adapter 34 cannot be slid with respect to the first adapter 12.

On the other hand, when the operator presses the release button 24, the cam member 22 moves against the biasing force of the coil spring 28, and the ball 32 can retreat from the engagement groove 52 toward the ball receiving groove 22b. Then, when the operator applies a force in a predetermined direction to the second adapter 34, the ball 32 retreats from the slide portion 18 to a position where the ball 32 does not protrude. The operator can separate the second adapter 34 from the first adapter 12 by sliding the second adapter 34. Therefore, the second adapter 34 to which the end effector 48 is attached is not unexpectedly detached and dropped, and the safety of the operator is improved.

The ball 32 abuts against the wall surface of the engagement groove 52 that is inclined by the angle β with respect to the advancing/retreating direction of the ball 32. Therefore, a force that brings the upper surface of the second adapter 34 into close contact with the lower surface of the main body portion 14 of the first adapter 12 acts, and the second adapter 34 is supported by the first adapter 12 without rattling. In addition, since the ball 32 abuts against the wall surface of the engagement groove 52 including two flat surfaces, at two points, namely, the point P3 and the point P4, rattling does not occur even when a large external force is applied to the second adapter 34. Further, since the wall surface shape of the engagement groove 52 is a combination of two flat surfaces, the processing of the engagement groove 52 is easy.

The present invention is not limited to the embodiments described above, and various configurations may be adopted therein without deviating from the essence and gist of the present invention.

What is claimed is:

1. An end effector exchange device comprising:
   a first adapter; and
   a second adapter,
   one of the first adapter or the second adapter being attached to a robot arm or a transport device, and an end effector being attached to another one of the first adapter or the second adapter, wherein
   a slide portion of the first adapter is fitted into a slot of the second adapter,
   a ball is disposed between a cam member supported by the slide portion and an opening edge portion constituting the slot,
   the ball is configured to advance toward or retreat from an engagement groove of the opening edge portion by movement of the cam member, and
   by operating a release button connected integrally with the cam member and also sliding the first adapter and the second adapter relative to each other, the ball retreats, and the first adapter and the second adapter are separated from each other.

2. The end effector exchange device according to claim 1, wherein
   the slide portion having a T-shaped cross section is fitted into the slot having a T shape.

3. The end effector exchange device according to claim 1, wherein
   the cam member is connected to a guide rod supported movably in a longitudinal direction of the slide portion.

4. The end effector exchange device according to claim 3, wherein
   the cam member includes a cam portion and a ball receiving groove,
   the cam portion is formed of an inclined part inclined with respect to a moving direction of the guide rod, and a parallel part parallel to the moving direction of the guide rod, and
   the parallel part is positioned between the inclined part and the ball receiving groove.

5. The end effector exchange device according to claim 1, wherein
   a shape of a wall surface of the engagement groove is formed by joining together two cylindrical surfaces each cut out with a predetermined central angle, the two cylindrical surfaces being joined on generating lines thereof so that a joint line on which the generating lines are joined becomes a valley line of the engagement groove.

6. The end effector exchange device according to claim 1, wherein
   a shape of a wall surface of the engagement groove is formed by causing two flat surfaces to intersect each other and rounding an intersection portion of the two flat surfaces.

7. The end effector exchange device according to claim 5, wherein
   the valley line of the engagement groove is inclined with respect to an advancing or retreating direction of the ball.

8. The end effector exchange device according to claim 6, wherein
   a valley line of the engagement groove is inclined with respect to an advancing or retreating direction of the ball.

* * * * *